United States Patent
Daniel et al.

[15] 3,673,887
[45] July 4, 1972

[54] INDEXABLE ADJUSTABLE ABUTMENT

[72] Inventors: David W. Daniel, Birmingham; Russell W. Anthony, Harper Woods, both of Mich.

[73] Assignee: Lear Siegler, Inc., Santa Monica, Calif.

[22] Filed: Sept. 23, 1970

[21] Appl. No.: 74,701

[52] U.S. Cl. ...................................................... 74/568 R
[51] Int. Cl. ............................................................ F16h 53/00
[58] Field of Search ................. 74/568 R, 568 M, 568 T, 822; 151/21 C

[56] References Cited

UNITED STATES PATENTS

| 877,687 | 1/1908 | Westfahl | 74/568 |
| 2,808,506 | 10/1957 | Skwarek | 74/568 M |
| 3,035,461 | 5/1962 | Benjamin et al. | 74/822 |

FOREIGN PATENTS OR APPLICATIONS

| 871,405 | 6/1961 | Great Britain | 151/21 C |

Primary Examiner—William F. O'Dea
Assistant Examiner—F. D. Shoemaker
Attorney—Whittemore, Hulbert & Belknap

[57] ABSTRACT

An indexable adjustable abutment having a plurality of independently removable and adjustable abutment elements in the form of headed screws having adjustable stop collars threaded thereto.

6 Claims, 3 Drawing Figures

PATENTED JUL 4 1972 3,673,887
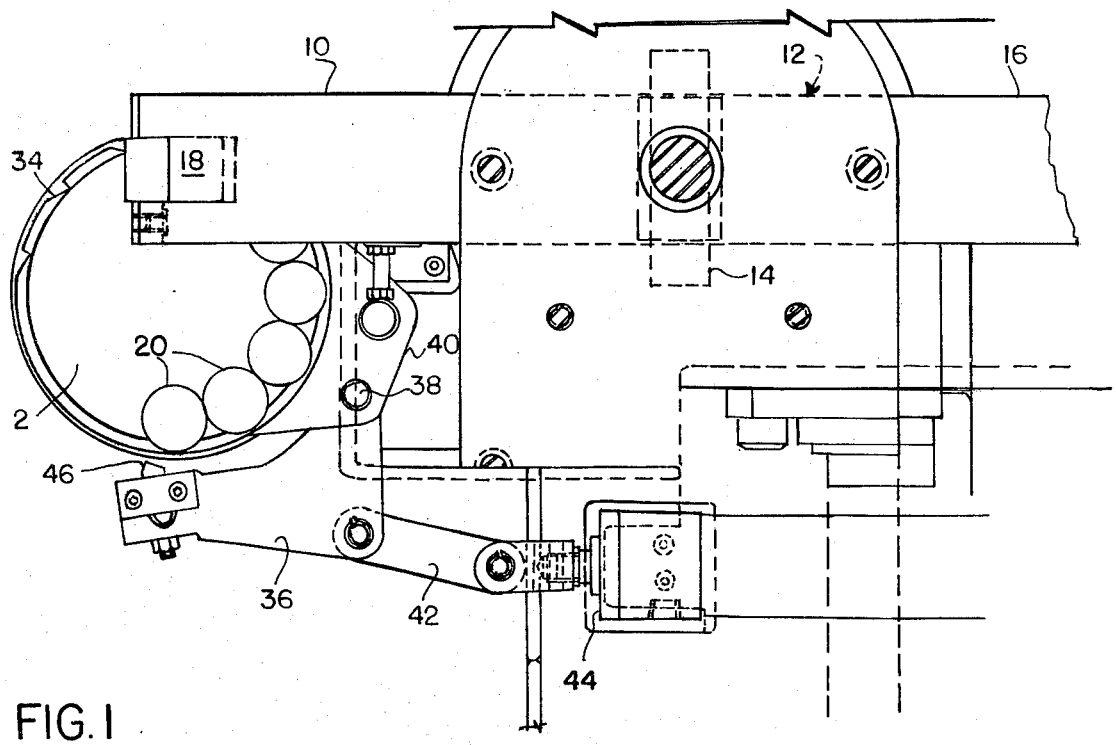
FIG.1
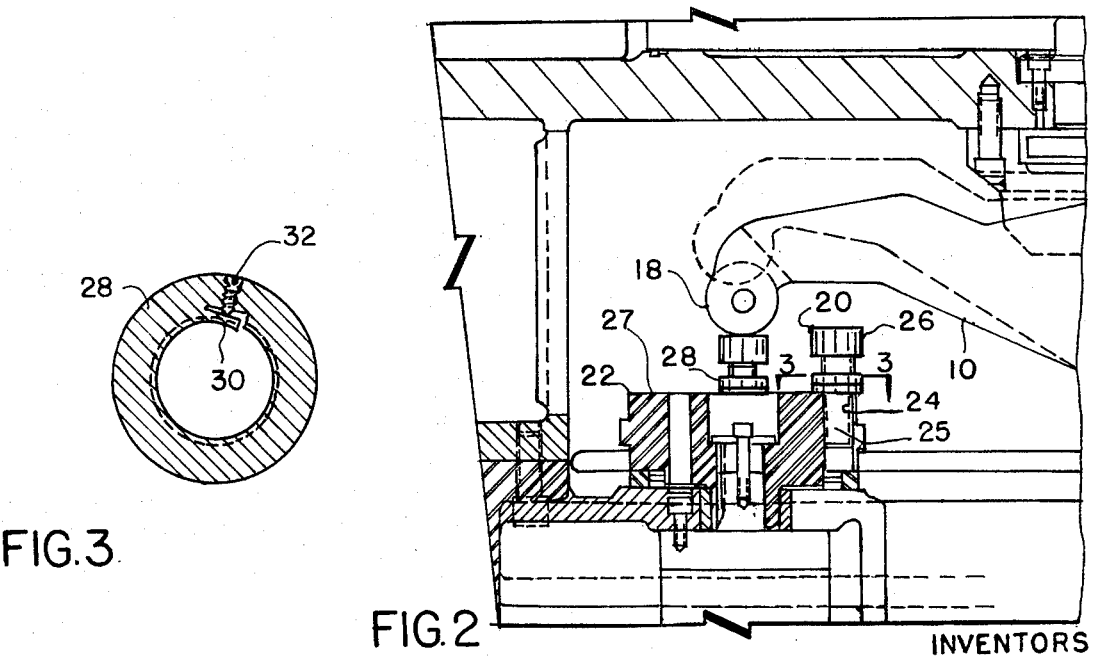
FIG.3
FIG.2
INVENTORS
DAVID W. DANIEL
RUSSELL W. ANTHONY
BY Whittemore, Hulbert
& Belknap

INDEXABLE ADJUSTABLE ABUTMENT

BRIEF SUMMARY OF THE INVENTION

The present invention is shown as applied to a gear finishing machine of the type disclosed in prior U.S. Pat. No. 3,443,478. Radial depth feed is provided between a gear finishing tool, such as a gear shaving cutter or gear rolling die. This feed is accomplished by means of a toggle, one link of which has an extending actuating arm engageable with an abutment to limit movement of the toggle. The link has an oppositely extending arm connected to actuating mechanism such for example as a piston and cylinder device.

In accordance with the present invention an indexable stop mechanism is provided for association with the arm of the toggle. This stop mechanism comprises a rotatable indexable support having thereon a group of individually removable and adjustable stop elements. For this purpose the rotatable indexable support is provided with a series of cylindrical recesses having smooth inner surfaces which are adapted to receive the lower portion of threaded screws or bolts constituting portions of the stop elements. The stop elements include adjustable threaded collars thereon. When a stop element is removed from the support the threaded collar may be accurately adjusted into position to determine the height of the upper surface of the head of the screw when the threaded lower portion is received into the recess in the support to a depth as determined by the threaded collar.

Preferably, the threaded collars include clamping means to lock them in adjusted position.

BRIEF DESCRIPTION OF THE DRAWINGS

FIG. 1 is a plan view of a portion of the mechanism.

FIG. 2 is a fragmentary vertical sectional view of the adjustable abutment mechanism.

FIG. 3 is an enlarged section through an adjustable stop collar.

DETAILED DESCRIPTION

Referring first to FIGS. 1 and 2, the mechanism comprises an arm 10 which constitutes a lateral extension of one link of a toggle mechanism for effecting vertical adjustment between a tool support and a work support. This may be applied to a gear finishing machine of the type illustrated in Daniel U.S. Pat. No. 3,443,478. The link indicated in its entirety at 12 is pivoted by a pin 14. The link 12 includes an actuating arm a portion of which is indicated at 16 and which is adapted to be connected to suitable means for swinging the link 12, such means for example having a piston and cylinder device (not shown).

The arm 10 at its outer end is provided with a roller 18 which engages the upper surface of one of the adjustable abutment elements designated at 20 as best seen in FIG. 2.

The machine is provided with a holder or rotatable support 22 having a multiplicity of smooth cylindrical openings 24 adapted to receive the threaded shanks 25 of threaded abutment elements 20 having abutment heads 26. The upper surface 27 of the support constitutes an accurately formed gauging surface for locating the abutment elements 20.

As best seen in FIG. 1, the heads 26 of the abutment elements are closely adjacent to each other and in this Figure are actually illustrated as being in contact. This arrangement of the abutment elements in an arcuate location around the axis of rotation of the support 22 precludes adjustment of the individual abutment elements, while they are in place.

Adjustment of these elements is accomplished by providing threaded sleeves or collars 28 which are threaded to the shank of the abutment elements and which are locked in position by suitable means such for example as a tang 30 partially sawed out from the material of the collar and associated with a clamping screw 32 which engages the tang and forces it into locking engagement with the threads on the shank of the abutment element 20.

It will be apparent that the individual abutment elements may readily be lifted out of the holder 22 and positioned in a suitable gauging support. At this time the clamping screw 32 is loosened and the collar 28 adjusted to provide exact adjustment of the top abutment surface of the head of the abutment element relative to a gauge block in which the abutment element is positioned for adjustment.

Means are provided for effecting angular step-by-step adjustment of the rotatable support or holder 22 and this means comprises a ratchet formation on its periphery providing ratchet teeth as indicated at 34. Associated with the holder 22 is an actuating lever 36 pivotally mounted as indicated at 38 to a ring 40 rotatably mounted on the holder 22. A link 42 connects the lever 36 to a piston and cylinder device indicated at 44.

In operation the toggle link 12 is rocked by the actuating means connected to the arm 16 so as to elevate the arm 10 and the roller 18 to a position above the array of abutment elements 20. At this time the piston and cylinder device indicated at 44 is actuated to move the link 42 to the left. This will move the pawl 46 into engagement with a ratchet tooth 34. Thereafter, continued movement of the link will effect an index rotation of the holder 22 to bring a different one of the abutment elements 20 into position beneath the roller 18.

While the adjustable abutment device including the rotatable indexable holder 22 with the independently removable and adjustable abutment elements 20 including the adjustable stop collars 28, are illustrated in conjunction with a particular apparatus employing feeding mechanism including a toggle, it will be understood that the invention is applicable wherever step-by-step adjustment of a machine element is required with the capability of micrometer adjustment of means providing a multiplicity of positions determined with utmost accuracy.

What we claim as our invention is:

1. Adjustable abutment structure comprising a movable holder having a gauge surface provided with a series of elongated contiguous openings therein, independently freely removable and adjustable abutment elements each of which constitutes a screw having an abutment head and a threaded shank, said threaded shanks being freely movable longitudinally in said openings, a locating collar threaded to said shank for adjustment thereon into a predetermined locating position and adapted to rest upon the gauge surface of the holder while the threaded shank of the screw extends into an opening in the holder.

2. Structure as defined in claim 1 in which said collar includes locking means for locking the collar in adjusted position on the shank of the abutment screw.

3. Structure as defined in claim 1 in which said holder is a rotatable support in which the openings are disposed in an arcuate array concentric with the axis of rotation of the holder.

4. Structure as defined in claim 3 comprising indexing ratchet means associated with the holder and effective to produce step-by-step angular motion thereof to position successive abutment elements in operative position.

5. Structure as defined in claim 1 in which said openings are smooth throughout their entire length to provide for simple insertion and removal of said elements.

6. Structure as defined in claim 1 in which the gauge surface of said holder is a flat horizontally disposed upwardly facing surface, and in which said abutment elements are retained in the openings in said gauge surface by gravity.

* * * * *